April 19, 1938.  G. WEBB  2,114,894
DISH CARRIER FOR DISHWASHING MACHINES
Filed Dec. 28, 1935
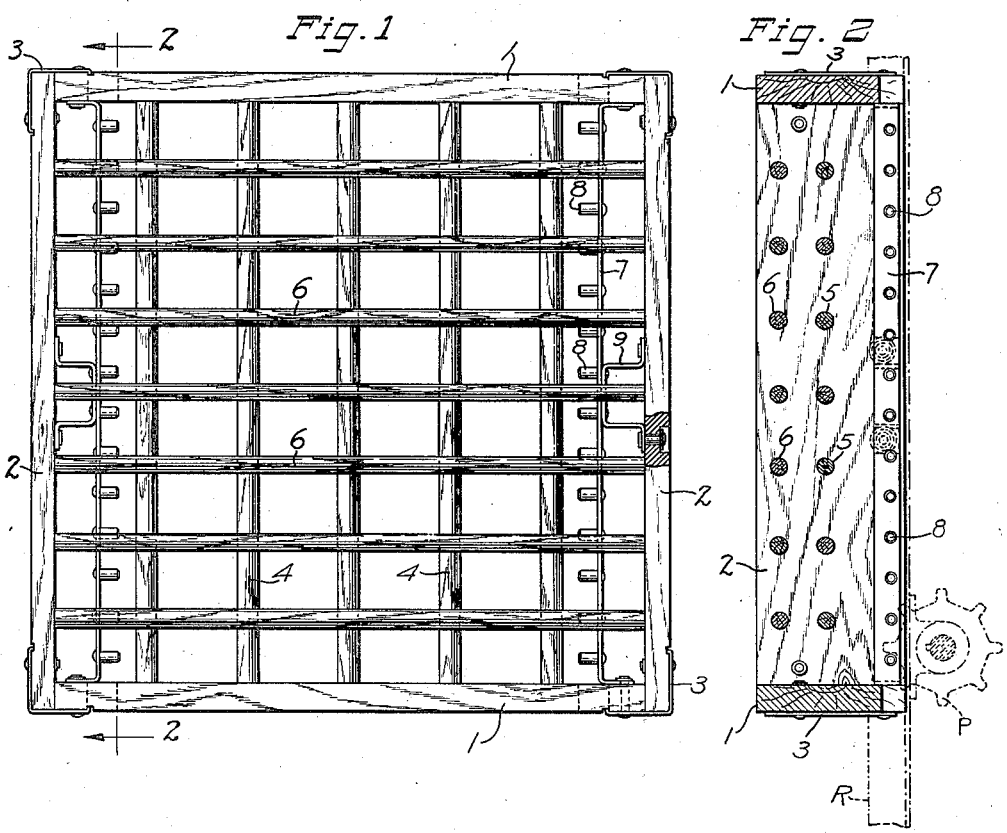
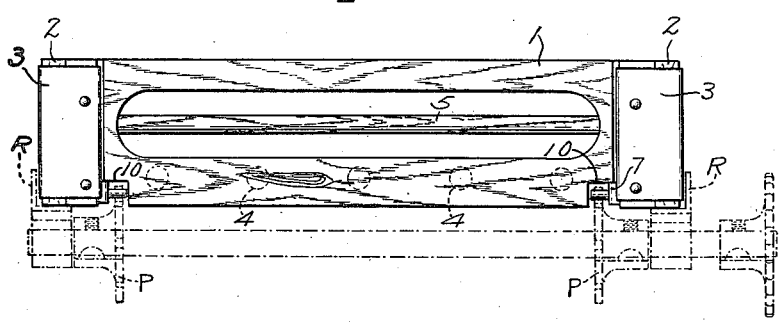
Inventor
George Webb
By S. Jay Teller
Attorney Patented Apr. 19, 1938

2,114,894

UNITED STATES PATENT OFFICE 2,114,894

DISH CARRIER FOR DISHWASHING MACHINES

George Webb, West Hartford, Conn., assignor to Colt's Patent Fire Arms Manufacturing Co., Hartford, Conn., a corporation of Connecticut Application December 28, 1935, Serial No. 56,455

5 Claims. (Cl. 198—1)

This invention relates to a dish carrier particularly adapted to be used in conjunction with a washing machine such as shown in the copending application of Chico, Porter and Webb for Dish washing machines, Serial No. 56,454, filed December 28, 1935.

The object of the invention is to provide a dish carrier having a simple and inexpensive rack construction thereon which is adapted to be readily engaged by the drive pinions of the dish washing machine and which is so located as to be protected from injury.

In the accompanying drawing I have shown the embodiment of the invention which I now deem preferable, but it will be understood that the drawing is intended for illustrative purposes only and is not to be relied upon as defining or limiting the scope of the invention, the claims forming a part of this specification being relied upon for that purpose.

Of the drawing:

Fig. 1 is a plan view of the dish carrier embodying the invention.

Fig. 2 is a longitudinal sectional view of the dish carrier taken along the line 2—2 of Fig. 1, this view also showing in dot-and-dash lines some of the cooperating parts of the dish washing machine.

Fig. 3 is a front view of the dish carrier, this view also showing in dot-and-dash lines some of the cooperating parts of the dish washing machine.

Referring to the drawing, it will be seen that the dish carrier comprises a main rectangular frame consisting of end walls 1, 1 and side walls 2, 2. These end and side walls are preferably formed of wood and they are connected together at the corners by means of metallic corner pieces 3, 3. Extending across the rectangular frame, preferably both longitudinally and transversely, are suitable dish supporting elements which are, or may be, also formed of wood. As shown, there are longitudinal supporting elements or rods 4, 4 and transverse supporting elements or rods 5, 5 and 6, 6 which are above the elements 4, 4 and which serve to support the dishes in upright or substantially upright position. The rack is adapted to be guided longitudinally through the washing machine by parallel guide rails R, R.

The dish carrier is provided with at least one toothed rack which extends longitudinally between the end walls and which is located above the bottom plane of the carrier. It is obviously desirable to have all parts of the rack above the said plane, as any downward projection of the rack would prevent the bottoms of the walls of the carrier from properly engaging with the table on which the carrier may rest. Preferably, there are two such racks which are identical in construction except for reversal of position, and a description of one of them will serve for both.

Each rack comprises a longitudinal strap 7 which is secured at its ends to the end walls 1, 1 and which is adjacent the corresponding side wall 2 but is transversely spaced therefrom. The strap 7 is provided with a series of longitudinal rack teeth and these rack teeth may advantageously consist of pins 8, 8 riveted in suitable holes in the strap 7 and projecting transversely therefrom toward the center of the carrier. The strap 7, by reason of its securement to the end walls and as it is transversely spaced from the side walls, additionally functions to strengthen and brace the carrier. In order to provide additional rigidity, the strap 7 is connected near its center with the corresponding side wall by means of a metallic bracket 9.

The racks are intended to be engaged by suitable drive pinions such as P, P on the machine, and inasmuch as the portions of the racks which engage the sprocket teeth are located above the plane of the bottom of the carrier, the end walls 1, 1 of the frame are provided with clearance recesses 10, 10 which are in longitudinal register with each other and also in longitudinal register with the teeth of the racks. As shown, the recesses are in the form of relatively narrow notches, there being two pairs of notches registering with the respective racks. The dish carrier is guided as aforesaid by suitable rails R, R, and the notches 10, 10 permit the carrier to pass over the sprocket wheels P, P without interference.

What I claim is:

1. A dish carrier for a dish washing machine, comprising in combination, a rectangular frame having dish supporting elements extending thereacross, and a longitudinal strap secured at its ends to the end walls of the frame and having a longitudinal series of rack teeth thereon, the said strap being separate from the dish supporting elements and below the level thereof and being adjacent one of the side walls of the frame but transversely spaced therefrom.

2. A dish carrier for a dish washing machine, comprising in combination, a rectangular frame having dish supporting elements extending thereacross, a longitudinal strap secured at its ends to the end walls of the frame and being adjacent one of the side walls of the frame but transversely spaced therefrom, the said strap being separate from the dish supporting elements and below the level thereof, and a series of pins carried by the strap and projecting transversely therefrom to form a series of rack teeth.

3. A dish carrier for a dish washing machine, comprising in combination, a rectangular frame having dish supporting elements extending thereacross, a longitudinal strap secured at its ends to the end walls of the frame and having a longitudinal series of rack teeth thereon, the said strap being separate from the dish supporting elements and below the level thereof and being adjacent one of the side walls of the frame but transversely spaced therefrom, and means near the middle of the strap for connecting it with the corresponding side wall.

4. A dish carrier for a dish washing machine, comprising in combination, a rectangular frame having longitudinally registering sprocket wheel clearance recesses in its end walls and including dish supporting means, and two longitudinally extending racks adjacent the opposite sides of said frame, each of said racks including a plurality of metallic teeth positioned above the plane of the bottom of the frame and in alignment with corresponding recesses in the end walls.

5. A dish carrier for a dish washing machine, comprising in combination, a rectangular frame having dish supporting elements extending thereacross and having two pairs of longitudinally registering sprocket wheel clearance notches in its end walls, and two longitudinal straps secured at their ends to the end walls of the frame and each having a longitudinal series of rack teeth thereon in register with corresponding notches in the end walls, the said straps being separate from the dish supporting elements and below the level thereof and being respectively adjacent the side walls of the frame but transversely spaced therefrom.

GEORGE WEBB.